(12) United States Patent
Schilling

(10) Patent No.: US 10,771,776 B2
(45) Date of Patent: Sep. 8, 2020

(54) APPARATUS AND METHOD FOR GENERATING A CAMERA MODEL FOR AN IMAGING SYSTEM

(71) Applicant: SONY CORPORATION, Tokyo (JP)

(72) Inventor: Hendrik Schilling, Heidelberg (DE)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/111,676

(22) Filed: Aug. 24, 2018

(65) Prior Publication Data

US 2019/0082173 A1    Mar. 14, 2019

(30) Foreign Application Priority Data

Sep. 12, 2017  (EP) .................................. 17190728

(51) Int. Cl.
| | |
|---|---|
| *H04N 17/00* | (2006.01) |
| *G06T 7/80* | (2017.01) |
| *G06T 15/06* | (2011.01) |
| *H04N 5/247* | (2006.01) |
| *G06T 7/70* | (2017.01) |
| *G06T 17/20* | (2006.01) |

(52) U.S. Cl.
CPC ............ *H04N 17/002* (2013.01); *G06T 7/70* (2017.01); *G06T 7/80* (2017.01); *G06T 15/06* (2013.01); *G06T 17/20* (2013.01); *H04N 5/247* (2013.01); *G06T 2207/30204* (2013.01); *G06T 2210/21* (2013.01)

(58) Field of Classification Search
CPC ........ H04N 17/002; H04N 5/247; G06T 7/80; G06T 15/06; G06T 7/70; G06T 17/20; G06T 2207/30204; G06T 2210/21
See application file for complete search history.

(56) References Cited

U.S. PATENT DOCUMENTS

| 5,822,066 | A  | * | 10/1998 | Jeong ............... G01B 11/255 356/521 |
|---|---|---|---|---|
| 9,552,662 | B2 | * | 1/2017 | Lee ..................... G06T 15/06 |
| 9,734,419 | B1 | * | 8/2017 | Ye ....................... G06K 9/209 |
| 9,830,733 | B2 | * | 11/2017 | Hwang ................. G06T 15/06 |
| 2004/0012544 | A1 | * | 1/2004 | Swaminathan ....... G06T 15/20 345/32 |

(Continued)

OTHER PUBLICATIONS

Albarelli, A. et al., "Robust Camera Calibration using Inaccurate Targets," © 2010, BMVC 2010, DOI: 10.5244/C.24.16, pp. 1-10.

(Continued)

*Primary Examiner* — Jefferey F Harold
*Assistant Examiner* — Humam M Satti
(74) *Attorney, Agent, or Firm* — Xsensus LLP

(57) ABSTRACT

The disclosure pertains to an apparatus comprising a circuitry. The circuitry is configured to obtain a calibration image of a target, to derive a sparse image based on the calibration image, wherein the sparse image includes image points, to derive ray support points based on the image points by performing an image to target mapping of the image points based on a polynomial function, wherein the ray support points being indicative of light rays reflected by the target and incidenting on an image sensor, and to generate a camera model based on the derived ray support points.

16 Claims, 6 Drawing Sheets

(56) References Cited

U.S. PATENT DOCUMENTS

| | | | | |
|---|---|---|---|---|
| 2015/0043827 | A1* | 2/2015 | Hara | G06K 9/2036 |
| | | | | 382/197 |
| 2016/0173842 | A1* | 6/2016 | De La Cruz | H04N 9/3185 |
| | | | | 353/70 |
| 2017/0098305 | A1* | 4/2017 | Gossow | G06T 7/80 |
| 2017/0337705 | A1* | 11/2017 | Bendall | G06F 3/04845 |

OTHER PUBLICATIONS

Anonymous CVPR submission #2968, "Parameter Estimation for Non-Central Imaging Systems," 2017, pp. 1-9.

Bergamasco, F. et al., "Can a Fully Unconstrained Imaging Model be Applied Effectively to Central Cameras?," 2013 IEEE Conference on Computer Vision and Pattern Recognition, Jun. 2013, pp. 1391-1398.

Grompone Von Gioi, R. et al., "Towards High-Precision Lens Distortion Correction," 2010 IEEE International Conference on Image Processing, Sep. 2010, pp. 1-5.

Grossberg, M.D. and Nayar, S.K., "A General Imaging Model and a Method for Finding its Parameters," Proceedings Eighth IEEE International Conference on Computer Vision (ICCV 2001), Jul. 2001, pp. 108-115.

Magill, A.A., "Variation in Distortion with Magnification," Journal of Research of the National Bureau of Standards, Research Paper 2574, vol. 54, No. 3, Mar. 1955, pp. 135-142.

Miraldo, P. et al., "Point-based calibration using a parametric representation of the general imaging model," 2011 IEEE International Conference on Computer Vision, Nov. 2011, pp. 1-8.

Nishimura, M. et al., "A Linear Generalized Camera Calibration from Three Intersecting Reference Planes," 2015 IEEE International Conference on Computer Vision (ICCV), Dec. 2015, pp. 2354-2362.

Ramalingam, S. et al., "Towards Complete Generic Camera Calibration," IEEE Conference on Computer Vision and Pattern Recognition (CVPR '05), Jun. 2005, San Diego, United States, vol. 1, pp. 1093-1098.

* cited by examiner

APPARATUS AND METHOD FOR GENERATING A CAMERA MODEL FOR AN IMAGING SYSTEM

CROSS-REFERENCE TO RELATED APPLICATION

The present application claims priority to European Patent Application 17190728.0 filed by the European Patent Office on 12 Sep. 2017, the entire contents of which being incorporated herein by reference.

TECHNICAL FIELD

The present disclosure generally pertains to an apparatus and a method for generating a camera model for a camera device like a single camera device or a multiple camera device. In particular, the present disclosure pertains to an apparatus and a method for generating a ray based camera model based on a passive target.

TECHNICAL BACKGROUND

Known are several techniques for camera calibration, for example, model based camera calibration and ray based camera calibration. In a model based camera calibration a projection and distortion is described by a simple parametric model, which is often only approximately true.

Ray based camera models generally describe a single camera or a multiple camera device based on a number of rays in 3D space. Each ray describes, how a certain 3D world point gets mapped onto a single pixel of an image sensor of the corresponding camera device. As illustrated by FIG. 1, light rays R, each reflected from a corresponding world point, are projected in accordance with the ray based camera model by a camera C to a sensor S.

The ray based camera model is a powerful camera model as it makes no assumption over a type of projection performed by the camera device, that is, the camera is described as a black box. However, existing calibration methods for ray based camera models are either complex and require active targets with perfect geometry or allow only insufficient calibration.

It is thus generally desirable to provide an apparatus and a method for performing a highly accurate calibration for central and non-central imaging systems in an easy manner.

SUMMARY

According to a first aspect the disclosure provides an apparatus comprising a circuitry configured to obtain a calibration image of a target;
derive a sparse image based on the calibration image, wherein the sparse image includes image points;
derive ray support points based on the image points by performing an image to target mapping of the image points based on a polynomial function, wherein the ray support points being indicative of light rays reflected by the target and incidenting on an image sensor; and
generate a camera model based on the derived ray support points.

According to a second aspect the disclosure provides a method, comprising:
obtaining a calibration image of a target;
deriving a sparse image based on the calibration image, wherein the sparse image includes image points;
deriving ray support points based on the image points by performing an image to target mapping of the image points based on a polynomial function, wherein the ray support points being indicative of light rays reflected by the target and incidenting on an image sensor; and
generating a camera model based on the derived ray support points.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
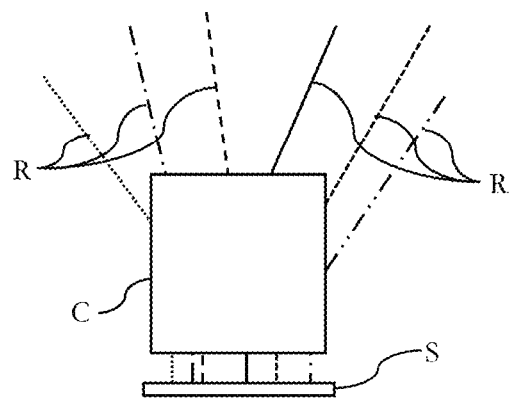
FIG. 1 shows a schematic principle of a ray based camera model.
Figure 2:
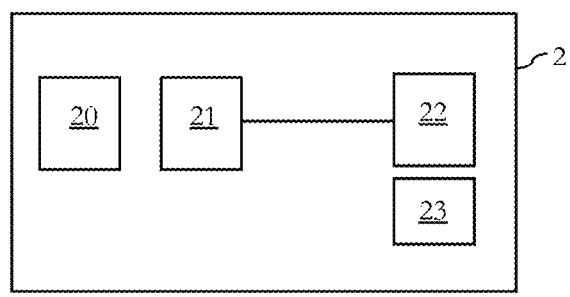
FIG. 2 shows a schematic illustration of a digital camera to be calibrated.

Before a detailed description of the embodiments under reference of FIGS. 2 to 14, general explanations are made.

The present disclosure pertains to an apparatus comprising a circuitry configured to provide a camera model, in particular a ray based camera model. The apparatus may be an electronic device including a camera device to be calibrated, wherein the camera device may include a single camera or multiple cameras like a camera array. The camera device may be central camera or a non-central camera. For example, the apparatus may be a digital camera or an electronic device including a camera device like a smart phone, a tablet computer, a laptop or any other electronic device. Alternatively, the apparatus may be connectable to an electronic device including a camera device, for example the apparatus may be a camera calibration apparatus connectable to the camera device to be calibrated. A connection between the apparatus and the electronic device with the camera device may be configured to allow a data exchange.

The circuitry may be a microprocessor of the electronic device including the camera device to be calibrated or a microprocessor of the camera calibration apparatus, respectively.

The circuitry is configured to obtain a calibration image (also referred to as first calibration image) of a target, for example a passive target as described in detail below. The calibration image may be an image of the target captured by a camera device to be calibrated. The calibration image may represent a particular view, preferably an arbitrary view, on the target, that is, the calibration image may be captured from a particular position of the camera device, wherein the position may be defined by a depth and an angle between the target and the camera device.

The circuitry is further configured to derive a sparse image (also referred to as first sparse image) based on the calibration image, wherein the sparse image includes image points (also referred to as first image points), which may be also denominated as feature points or calibration points. The sparse image may be derived for example based on marker detection. Thereby, a structure of the target in the calibration image may be analyzed and the image points may be derived based on markers each representing a partial structure of the structure of the target. The sparse image may be derived based on any other pattern detection technique. For color images (colored calibration images) the sparse image may be acquired based on a Bayer pattern. This pattern detection technique may allow a selection of relevant pixels of the calibration image, allowing the separate detection of the different color channels without an interpolation induced by demosaicing. The sparse image may have a high features density of image points. For example, the feature density may include 10.000 to 50.000 image points, in particular 20.000 to 30.000 image points.

The circuitry is further configured to derive ray support points (also referred to as first ray support points) indicative of light rays reflected by the target and incidenting on an image sensor. The ray support points may define the rays in space, that is, sparse target to image correspondences. The ray support points are derived based on the image points by performing an image to target mapping of the image points based on a polynomial function, in particular based on a combination of a perspective and a polynomial function. For example, each ray support point may be derived by fitting a combined perspective and polynomial calculation, preferably a local combined perspective and polynomial calculation. A large number of calibration points, as mentioned above, may provide a relatively dense sampling (in particular for a passive target) of correspondences between image points and the respective target support points.

The circuitry is further configured to generate the camera model, in particular the ray based camera model, based on the derived ray support points.

The ray based camera model only describes the ray model. The circuitry may further be configured to output parameters of the ray based camera model, in particular a ray direction and a camera pose (position of the camera device). The circuitry may further be configured to use these parameters for undistortion, rectification and the like.

In summary, using sparse image to target mapping which is the input generated by the marker detection, a local function fit may be performed to generate ray support points at specific image coordinates, which are basically the corresponding target coordinates, which are visible at respective pixels of the image sensor, as illustrates in FIG. 1. From those sparse correspondences missing correspondences for individual rays may be calculated.

In some embodiments the target may be a passive target, preferably a high density passive calibration target, which provides a large number of target points (world points). The passive target may be a passive imperfect target, also denoted as passive inaccurate target, which may have a defective target geometry. The passive target may be for example a fractal calibration target. The passive target may be preferably a passive planar calibration target. Alternatively, a checkerboard pattern, a circle grid pattern or any comparable pattern may be used as target.

Thus, the circuitry of the apparatus may implement offline camera calibration from passive targets, specifically with respect to unknown or not accurately known central cameras and non-central cameras.

Alternatively, the target may be an active target. For color images the target may be a Bayer pattern as already mentioned above.

In some embodiments the circuitry may be configured to perform the image to target mapping based on a generic 2D polynomial function. In particular, the ray support points may be derived using a generic 2D polynomial function as exemplarily described in detail below. Alternatively, ray support points may be derived based on polynomials of higher degrees.

In some embodiments the circuitry may be further configured to generate weighted collections of image points, wherein the image to target mapping is performed based on the weighted collections of image points. The weighting may be according to Gaussian distribution or another continuous probability distribution. Thereby, adjacent collections of image points may have several image points in common. The weighting may be performed in the local fit, to weaken the influence of those input samples which are further away from the desired pixel location of the ray support point. Thereby, support points may be derived at the desired location and an accuracy in the presence of noise in the input data may be increased.

In other words, using sparse target to image correspondences derived from the passive target ray support points may be derived at predetermined pixel positions by fitting a combined polynomial function at each ray support point weighted e.g. with a Gaussian function to reduce an influence of more distant samples.

For example the ray support points may be derived using a generic 2D polynomial $\Phi_{22}$ based on the following equations:

$$\Omega_i, \Phi_{22_i} = \underset{\Omega, \Phi_{22}}{\operatorname{argmin}} \sum_{(j,t_j) \in C} (t_j - \Theta(j))^2 \cdot G(j - i) \quad (1)$$

$$\Theta(x) = \Omega(x) + \Phi_{22}(x) \quad (2)$$

$$G(x) = \exp\left(\frac{x^2}{2\sigma^2}\right) \quad (3)$$

Therein, C is a locally weighted collection of image points, j is an image point in target coordinates, $t_j$ is a target point and i is a pixel coordinate. $\Theta$ estimates target coordinates from an image coordinate x using a perspective warp $\Omega$ and the 2D polynomial $\Phi_{22}$. A quadratic error is weighted according to the Gaussian distribution G, to give more weight to samples which are close to the desired image coordinates. The $\sigma$ is a constant, expressing a smoothness of the mapping, and $\Omega$ is a simple perspective transform using eight parameters, while the 2D polynomial $\Phi_{22}$ has the constant and linear terms removed, as those can be modeled by the perspective transform $$\Phi_{22}(x) = \varphi_{13} y^2 + \varphi_{22} xy + \varphi_{23} xy^2 + \varphi_{31} x^2 + \varphi_{32} x^2 y + \varphi_{33} x^2 y^2 \quad (4)$$

The result of equation (1) is used to calculate the corresponding target location $t_i$ for t:

$$\Theta_i(i) = t_i \quad (5)$$

This procedure may be repeated for each ray and results may be stored in a calibration proxy.

In some embodiments the circuitry may be further configured to derive an error metric of the derived ray support points, wherein the camera model is generated further based on the derived error metric.

In some embodiments, in order to derive the error metric, the circuitry may be further configured to calculate ray-target intersections, to compare the ray-target intersections with the ray support points to derive the error metric of the derived ray support points and to transform the error metric from target coordinates into image coordinates. The ray-target intersections may be calculated based on a camera pose relative to the target and a ray direction. The camera pose and/or the ray direction may be detected or modeled.

Thus, given the derived ray support points and the ray based camera model an error metric may be derived which describes how consistent a single ray is with observed target coordinates from the calibration images, by intersecting a modeled ray with the target. The difference between the modeled intersection and the actually observed ray-target intersection may give the error of the camera model which is then minimized using a non-linear least squares solver (optimizer).

In particular, the calibration may be achieved by solving:

$$\operatorname*{argmin}_{o,d,R,T} \sum_{i \in rays} E_1(o_i, d_i, R, T; t_i)^2 \quad (6)$$

wherein the error E1 is calculated as the difference, in camera coordinates, between the measured target location and the intersection between the ray and a plane defined by $p_3$:

$$E_1(o_i, d_i, R, T, t_i) = p - (o + p_3 \cdot d) \quad (7)$$

with $$p = R \begin{pmatrix} t_1 \\ t_2 \\ t_3 \end{pmatrix} + T \quad (8)$$

wherein $t_i$ is a constant target location provided by the calibration proxy, while a ray origin o and a direction d, as well as transformations from target to camera coordinates given by R and T are parameters to be estimated.

The error calibration may be further improved by regarding an error propagation using first order Taylor series about the image point i, given as the Jacobian matrix $J_i$, which can be calculated numerically on proxy generation. The step from camera to image coordinates can then be implemented using $R^{-1}$ to move from camera to target coordinates and the inverse of the Jacobian matrix, to get from target coordinates to image coordinates. The error in image coordinates, given constant target coordinates t and Jacobian matrix $J_i$ may then be:

$$E_2(o,d,R,T;J_i,t) = J_i^{-1} \cdot R^{-1} \cdot E_1(o,d,R,T;t_i) \quad (9)$$

In some embodiments the circuitry may be further configured to model a target deformation based on a low resolution mesh whose deformation is applied to the ray support points of the sparse image based on bilinear interpolation.

To enable the determination of target geometry, the target may be modeled as a fixed resolution mesh using a regular grid, where each grid point stores an offset from the perfect target. These offsets may be transferred to the observed target locations in the calibration proxy based on a bilinear interpolation. This influence of grid points to the observed target points may be only determined by the observed target coordinates, and therefore independent of the optimization process. For the implementation this means that the additional parameters can be passed as four 3D parameters with associated constant weights w determined by the bilinear interpolation in target space:

$$E_3(m,o,d,R,T;w,J_i,t) = J_i^{-1} \cdot R^{-1} \cdot E_1(o,d,R,T;t_m(m;w,t)) \quad (10)$$

With $$t_m(m; w, t) = t + \sum_n w_n \cdot m_n \quad (11)$$

wherein $w_u$ are the additional constant weights, determined using the known target coordinates and the four neighboring mesh points $m_n$. Therefore the full model may be provided by:

$$\operatorname*{argmin}_{m,o,d,R,T} \sum_{i \in rays} E_3(m_i, o_i, d_i, R, T; w_i, J_i, t_i)^2 \quad (12)$$

To avoid artefacts on a border of the mesh, an explicit smoothness term added at grid points which fall below a certain number of samples may be added.

In summary, after optimizing the ray parameters, a canonical form may be derived, removing ambiguities by additionally enforcing that a center ray points in a z-direction, and that a ray directly to the right of the center ray stays on a x-z-plane, and by optimizing a z-position of the camera to be where the rays are closest to the center ray in the least square sense.

In some embodiment the circuitry may be further configured to obtain one or more second calibration images representing a different view on the target than the first calibration image and to generate the camera model further based on the second calibration images. The second calibration images may be captured by the camera device from different camera positions, that is, at multiple depths and angles. In other words, the camera device may be moved after capturing each of the calibration images. One single target may underlie all calibration images, that is, the first calibration image and the second calibration images.

In particular, the circuitry may be further configured to derive a second sparse image based on each of the second calibration images, wherein the second sparse image includes second image points, to derive second ray support points based on the second image points by performing an image to target mapping of the second image points based on a polynomial function, wherein the second ray support points being indicative of light rays reflected by the target and incidenting on the image sensor and to generate a camera model based on the derived second ray support points. The derivation of the second ray support points may be performed in an way analog to the derivation of the first ray support points described above. In particular, the polynomial fitting and derivation of the error metric with respect to the second calibration image may be performed analog to that with respect to the first calibration image.

For generating the camera model, for all calibration images the same pixel coordinates may be used for a single ray, as this is the basic assumption of the ray based camera model: A single ray maps a set of world points onto a single pixel.

In some embodiments the calibration image may be captured by a camera of a multiple camera device. The circuitry may be further configured to obtain a calibration image captured by another camera of the multiple camera device and to generate the camera model further based on the calibration image captured by the other camera, wherein the camera model is a camera model for the multiple camera device.

The method is especially well suited for highly accurate calibrations of multi camera setups like camera arrays. For the calibration of a camera array, multiple views of the calibration target are recorded for the whole array. On calibration the relative pose of all cameras is optimized jointly with the pose of the targets and the ray parameters.

In some embodiments, the apparatus may further comprise the image sensor. The image sensor may be a semiconductor charge-coupled device (CCD), an active pixel sensor e.g. in complementary metal-oxide-semiconductor (CMOS) or N-type metal-oxide-semiconductor (NMOS, Live MOS) technologies or any other image sensor. The image sensor may comprise a plurality of pixels, preferably arranged as a pixel array, wherein the camera model indicates ray support points derived from different calibration images, wherein the indicated ray support points derived from the different calibration images are to be projected onto a corresponding pixel of the image sensor.

In summary, model-less calibration avoids the necessity to select the correct distortion model, ray based calibration allows calibration/assessment of non-central cameras, passive targets simplify fabrication of calibration targets, specifically for large targets and calibration of mesh deformation allows the usage of imperfect targets, e.g. printed targets.

The disclosure further pertains to a method for providing a camera model, in particular a ray based camera model. According to the method a calibration image of a target, in particular a passive target, is obtained, a sparse image is derived based on the calibration image, wherein the sparse image includes image points, ray support points are derived based on the image points by performing an image to target mapping of the image points based on a polynomial function, wherein the ray support points being indicative of light rays reflected by the target and incidenting on an image sensor, and the camera model is generated based on the derived ray support points. The method may be performed by an apparatus for providing a camera model, for example the apparatus described above.

In some embodiments the target may be a single passive target as it is described above.

In some embodiments the image to target mapping may be performed based on a generic 2D polynomial function. In particular, a 2D polynomial fitting of each image point or collection of image points may be performed as outlined above.

In some embodiments weighted collections of image points may be generated, wherein the image to target mapping is performed based on the weighted collections of image points as explained in more detail above.

In some embodiments an error metric of the derived ray support points may be derived, wherein the camera model is generated further based on the error metric. To derive the error metric, target intersections may be calculated, the ray-target intersections may be compared with the ray support points to derive the error metric of the derived ray support points and the error metric may be transformed from target coordinates into image coordinates. With respect to details for deriving the error metric it is referred to the above explanations.

In some embodiments a target deformation may be modeled based on a low resolution mesh whose deformation is applied to the ray support points of each sparse image based on bilinear interpolation as outlined in detail above.

In some embodiments one or more second calibration images representing a different view on the target than the first calibration image may be obtained and the camera model may be generated further based on the further calibration image as described in detail above.

In some embodiments the calibration image may be captured by a camera of a multiple camera device. According to the method a calibration image captured by another camera of the multiple camera device may be obtained and the camera model may be generated further based on the calibration image captured by the other camera, wherein the camera model is a camera model for the multiple camera device as detailed above.

In some embodiments the camera model may indicate ray support points derived from different calibration images, wherein the indicated ray support points derived from the different calibration images are to be projected onto a corresponding pixel of the image sensor as described above.

With respect to further details of the method it is referred to the above explanations relating to the apparatus for generating a camera model. The described details, of course, may be applied to the method in an analogous way.

The methods as described herein are also implemented in some embodiments as a computer program causing a computer and/or a circuitry to perform the method, when being carried out on the computer and/or circuitry. In some embodiments, also a non-transitory computer-readable recording medium is provided that stores therein a computer program product, which, when executed by a circuitry, such as the circuitry described above, causes the methods described herein to be performed.

Returning to FIGS. 2 to 14, FIG. 2 schematically shows a digital camera 2 comprising a lens system 20 and an image sensor 21. The image sensor 21 is a CCD sensor having a pixel array. The digital camera 2 further includes a circuitry 22 configured to perform a ray based camera calibration. The circuitry 22 is connected to the image sensor 21 to receive captured images and to provide the generated ray based camera model. In addition, the digital camera 2 comprises a data storage 23 for storing a calibration proxy.

Figure 3:
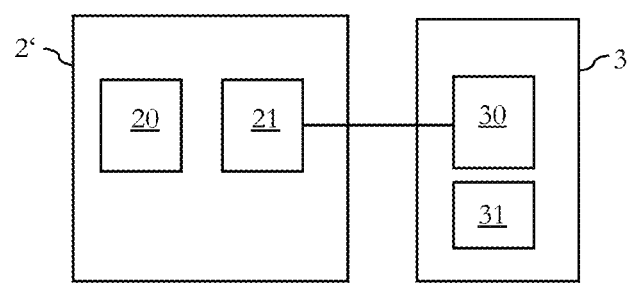
FIG. 3 shows a schematic illustration of a camera calibration apparatus connected to a digital camera to be calibrated.

FIG. 3 schematically shows a camera calibration apparatus 3 connected to a camera device 2' having the lens system 20 and the image sensor 21. The camera calibration apparatus 3 comprises a circuitry 30 configured to provide a ray based camera model and a data storage 31. The camera calibration apparatus 3 is connected to the camera device 2' to be calibrated.

Figure 4:
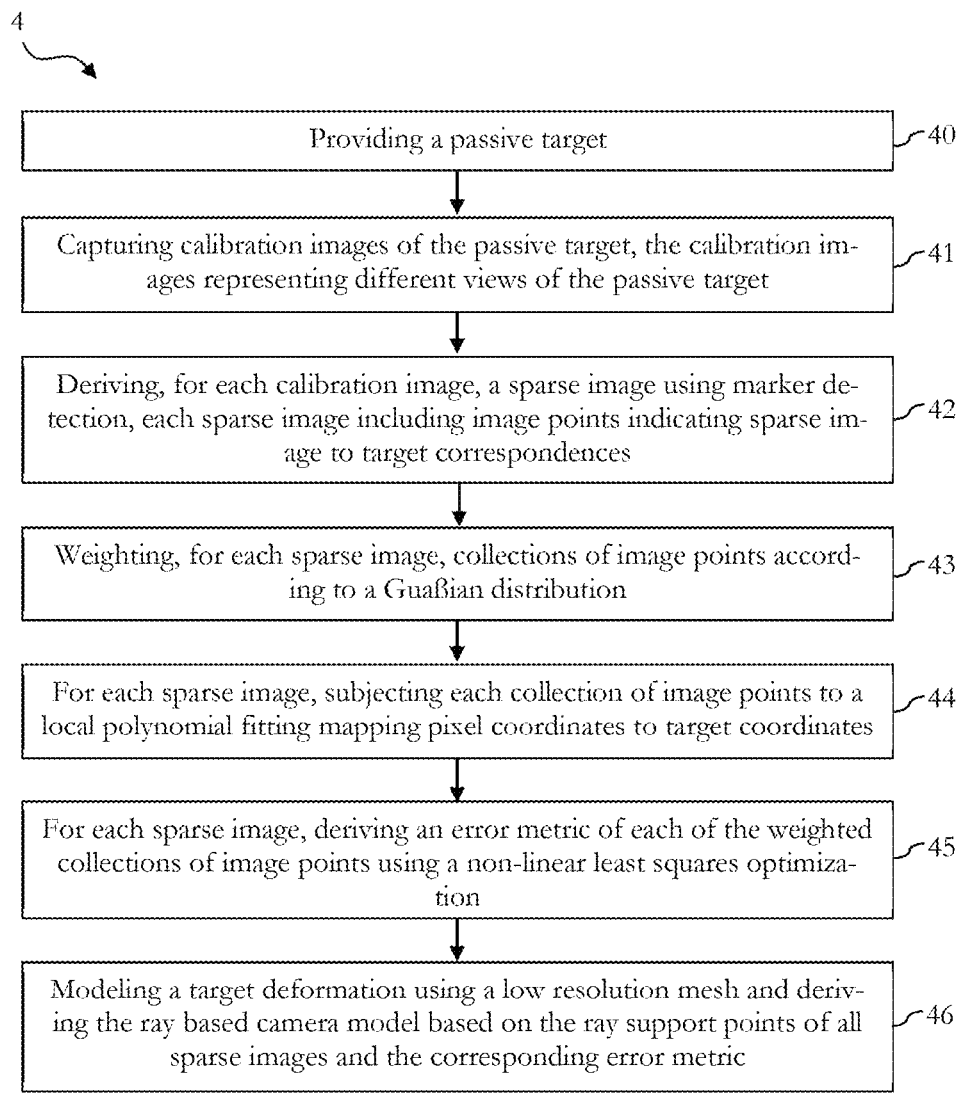
FIG. 4 schematically illustrates a method for generating a ray based camera model.

FIG. 4 shows a flow chart of a method 4 for providing a ray based camera model. The method may be carried out by the camera device 2 of FIG. 2 or the separate camera calibration apparatus 3 connected to the camera device 2' of FIG. 3

Figure 5:
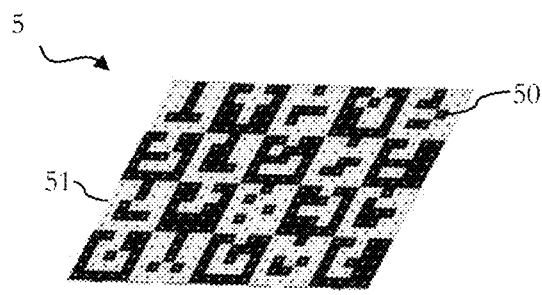
FIG. 5 schematically illustrates an example of a passive target.

At 40 a passive target in form of a planar imperfect passive target is provided. An example of the planar imperfect passive target 5 is illustrated in FIG. 5. The planar imperfect passive target 5 comprises an irregular structure composed of dark squares 50 having a bright center point and bright squares 51 having a dark center point.

Figure 6:
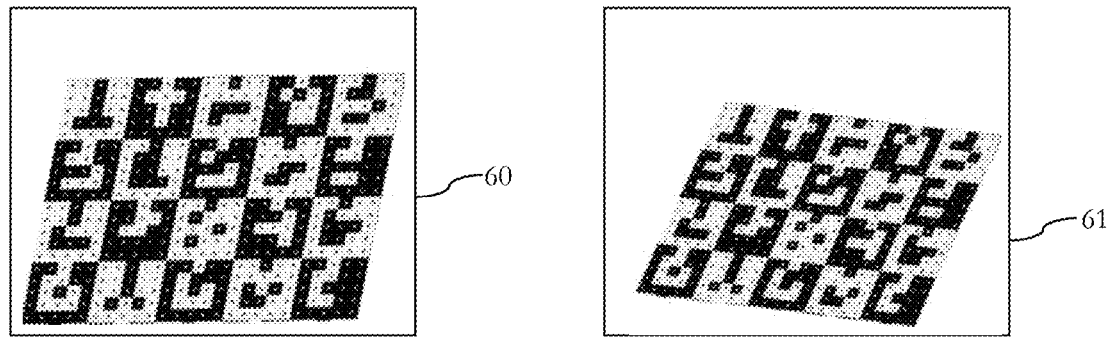
FIG. 6 schematically illustrates two calibration images captured by the camera, the calibration images representing the passive target at different views.

At 41 the camera to be calibrated captures several images of the passive target. The captured images represent different views of the passive target shown in FIG. 5. Two examples of captured images 60, 61, which represent calibration images, are represented by FIG. 6.

Figure 7:
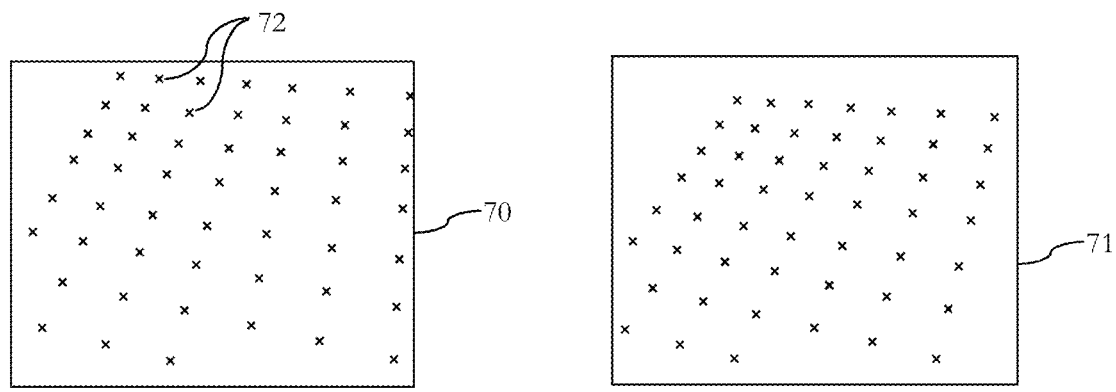
FIG. 7 schematically illustrates two sparse images, each corresponding to one of the two calibration images of FIG. 6.

At 42, for each calibration image, a marker detection is performed to derive a corresponding sparse image. The sparse image includes a plurality of image points, wherein each of the image points represents a sparse image to target correspondence. FIG. 7 shows two sparse images, wherein the sparse image 70 is derived from the calibration image 60 and the sparse image 71 is derived from the calibration image 61. Each of the sparse images 70, 71 comprises image points 72, arranged on a distorted array, wherein the distortion depends on the view on the target in the corresponding calibration image.

Figure 8:
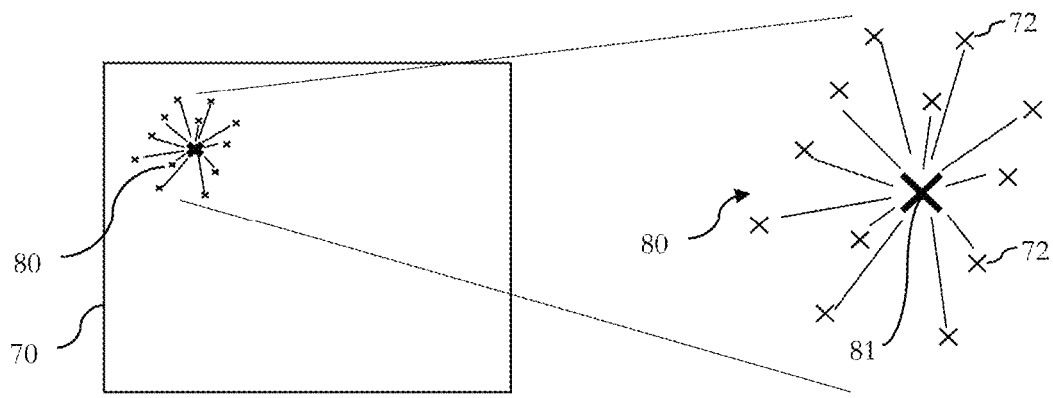
FIG. 8 schematically illustrates a weighted collection of image points.

At 43, for each sparse image, collections of image points are weighted according to a Gaußian distribution. An example of an accordingly weighted collection 80 of image points is presented by FIG. 8, which visualizes weights for a single collection 80 of image points 72. FIG. 8 shows on the left the collection 80 of image points in the calibration image 70 and on the right an enlarged presentation of the collection 80 of the image points 72 and a weighted center point 81 of the collection 80. The weighting is performed for all collections of image points of each sparse image.

Figure 9:
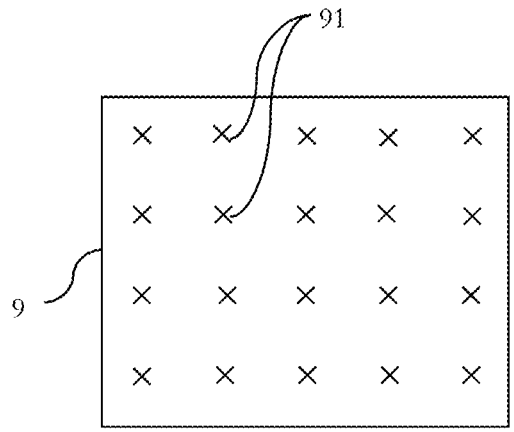
FIG. 9 schematically illustrates ray support points.

At 44, for each sparse image, each of the weighted collections of image points is subjected to a local polynomial fitting, which maps pixel coordinates to target coordinates, to derive a ray support point per weighted collection. Thereby, a generic 2D polynomial calculation, as indicated above with respect to general explanations, is used. The derived ray support points 90 are illustrated by FIG. 9, which shows a regular array 9 of ray support points 90. The process is repeated for all rays as well as for all calibration images.

At 45, for each sparse image, an error metric of each of the ray support points is derived. The error metric is derived using a non-linear least squares optimization.

Figure 10:
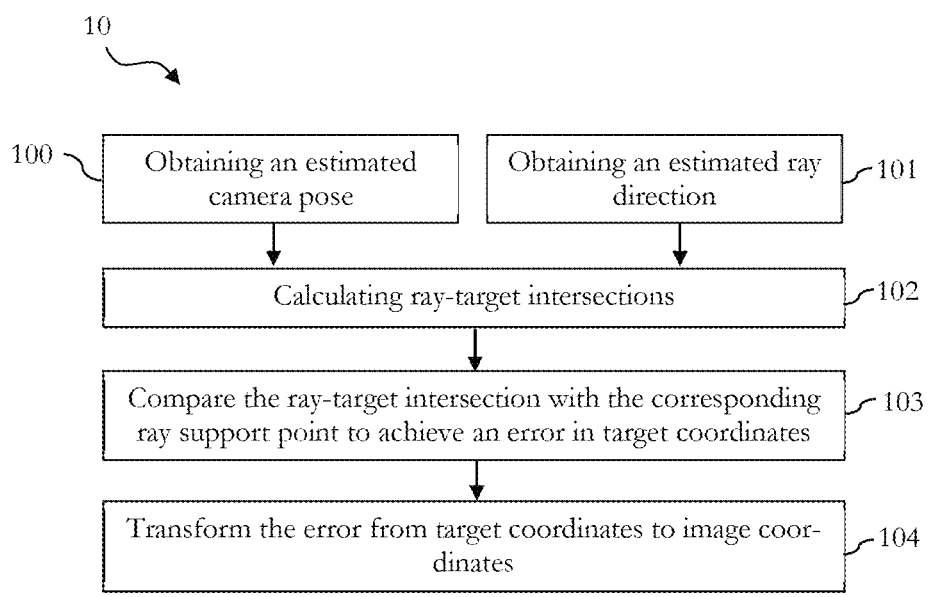
FIG. 10 schematically illustrates a flow chart of a method for deriving an error metric.

FIG. 10 illustrates a flow chart of a method 10 for deriving the error metric which is used in a non-linear least squares optimization.

At 100 an estimated pose of the camera device relative to the target is obtained. The pose of the camera device is estimated based on a size and an orientation of the target in the calibration image.

At 101 an estimated ray direction is obtained. The ray direction is the direction of a ray corresponding to a ray indicated by the ray support point.

At 102, for each estimated ray, a ray-target intersection point between the ray and the target is calculated based on the obtained pose of the camera and the ray direction.

At 103 these ray-target intersections are compared with the ray support points to derive the error in target coordinates. As outlined in the general explanations above, the error is the difference between the ray-target intersection and each ray support point.

At 104 the calculated error is transformed from target coordinates to image coordinates. The transformation is carried out using an inverse of derivatives of the ray support points allowing the transformation into image coordinates.

The error metric is derived for each ray and the corresponding ray support points derived from each of the calibration images.

Referring back to FIG. 4, at 46 a target deformation is modeled using a low resolution mesh and the camera model is derived from the ray target points, the error metric and the target deformation. In particular, the mesh deformation is optimized within the error metric. The modeling and derivation of the camera model are carried out as indicated in the general explanations above.

Figure 11:
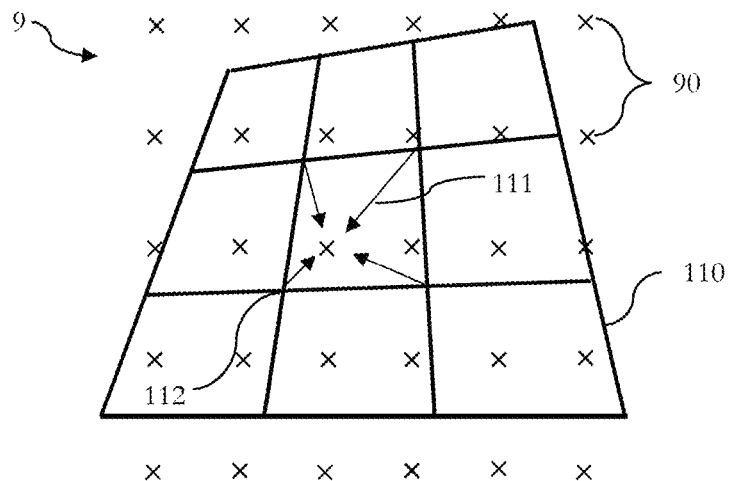
FIG. 11 schematically illustrates a bilinear interpolation used for mesh modeling.

FIG. 11 illustrates a visualization of the bilinear interpolation used for mesh modeling. In detail, FIG. 11 shows an array 9 of fitted ray support points 91 and a target grid 110 that is unknown and initialized as perfect grid overlaid to the array 9 of ray support points 91. The arrows 111 indicate a fixed influence of the grid points 112 (grid intersections) on an image/target pair depending on the detected target coordinates. Thus, an influence of an individual point in the mesh on the modeled target location depends on the fixed target coordinates which themselves are not subject to optimization and therefore constant.

Figure 12:
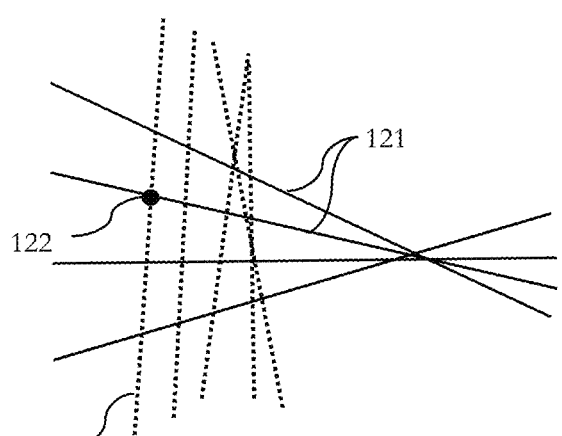
FIG. 12 schematically illustrates a ray based camera model generated based on the ray support points corrected by using the derived error metric.

The camera model is illustrated by FIG. 12, which visualizes the target 120 arranged in different positions and at different orientations and the light rays 121. In FIG. 12 a calibration target 120 placed at several positions indicated with thick dotted lines is intersected by camera rays 121 indicated by straight lines. The intersection points 122 between targets 120 and rays 121 are given by the ray support points 90 derived as described above. Both, the target locations as well as the ray parameters are estimated jointly to derive the camera calibration.

Figure 13:
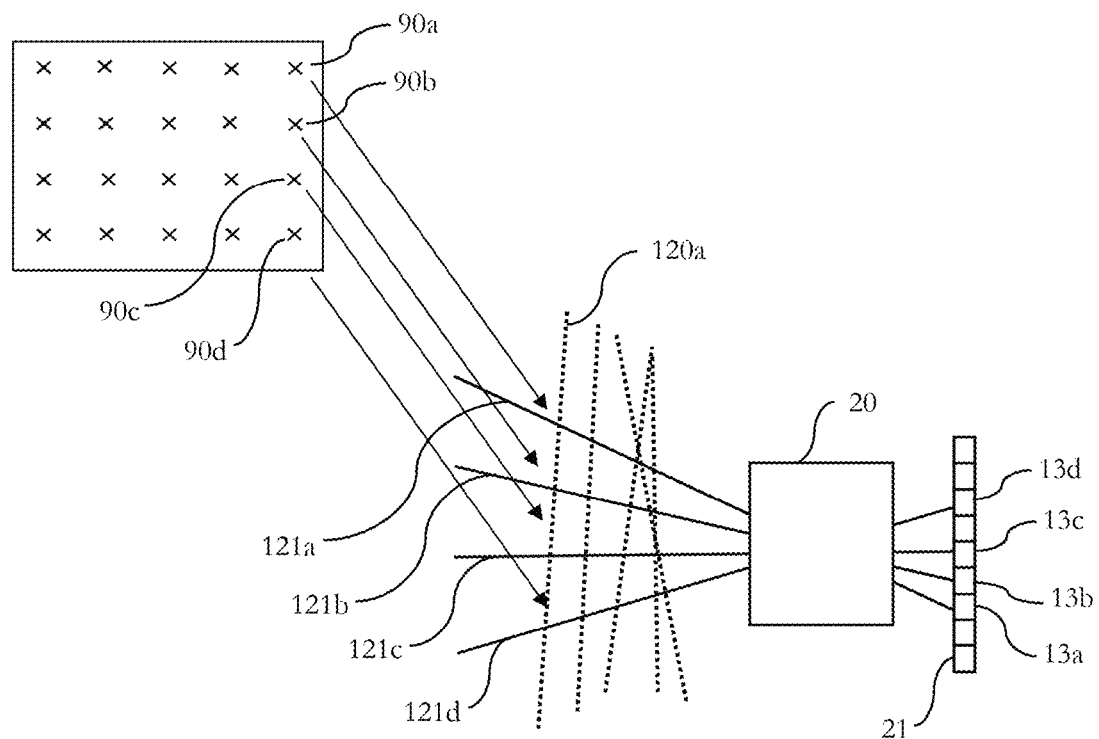
FIG. 13 schematically illustrates a relation between the ray support points corrected by using the derived error metric and the ray based camera model of FIG. 12.

FIG. 13 illustrates a relation between the ray support points 90 and the camera model. In detail, the ray support points 90 derived from a calibration image showing the target in the corresponding view relate to the intersection points 122 of the rays 121 and the target 120 at a position and orientation corresponding to the view on the target. In particular, ray support point 90a relates to the intersection point between the ray 121a and the target 120a. Analogous, each ray support point 90b, 90c, 90d relates to the corresponding intersection points between each ray 121b, 121c, 121d and the target 120a. The rays 121 on the other hand project the intersection points through the lens system 20 onto the image sensor 21, in particular to a related pixel 13a, 13b, 13c, 13d of the image sensor 21. In detail, the ray 121a is projected onto the pixel 13a of the image sensor 21. Analog, the other rays 121b, 121c, 121d are projected onto a corresponding pixel 13b, 13c, 13d of the image sensor 21.

Figure 14:
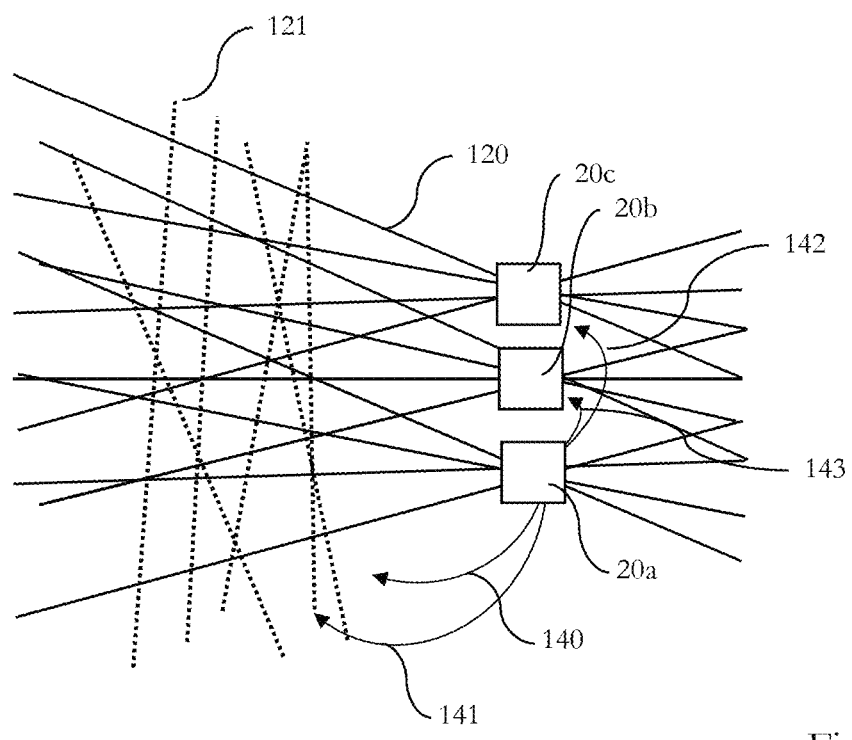
FIG. 14 schematically illustrates a ray based camera model for a multiple camera array.

The camera device may be a multiple camera device like a camera array. In this case, 40 to 46 of the method illustrated in FIG. 4 are repeated for each camera of the camera array. The ray based camera model for the camera array is then generated based on the ray support points of each of the views and each of the cameras. FIG. 14 visualizes a calibration of a camera array with three cameras 20a, 20b, 20c. Target poses as indicated by arrows 140, 141 and camera poses as indicated by arrows 142, 143 are expressed relative to a reference camera (first camera 20a). Ray parameters and poses are optimized within a global optimization problem which optimizes the image space error.

It should be recognized that the embodiments describe methods with an exemplary ordering of method steps. The specific ordering of method steps is however given for illustrative purposes only and should not be construed as binding. For example the ordering of 43, 44 and 45 in the embodiment of FIG. 4 may be exchanged. Also, the ordering of 100 and 101 in the embodiment of FIG. 10 may be exchanged. Other changes of the ordering of method steps may be apparent to the skilled person.

A method for controlling an electronic device, such as the camera device 2 or the apparatus 3 discussed above, is described in the following and under reference of FIG. 4. The method can also be implemented as a computer program causing a computer and/or a circuitry, such as circuitry 22, 30 discussed above, to perform the method, when being carried out on the computer and/or circuitry. In some embodiments, also a non-transitory computer-readable recording medium is provided that Stores therein a computer program product, which, when executed by a circuitry, such as the circuitry described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An apparatus comprising a circuitry configured to
obtain a calibration image of a target;
derive a sparse image based on the calibration image, wherein the sparse image includes image points;
derive ray support points based on the image points by performing an image to target mapping of the image points based on a polynomial function, wherein the ray support points being indicative of light rays reflected by the target and incidenting on an image sensor; and
generate a camera model based on the derived ray support points.

(2) The apparatus of (1), wherein the target is a passive target.

(3) The apparatus of (1) or (2), wherein the image to target mapping is performed based on a generic 2D polynomial function.

(4) The apparatus of any one of (1) to (3), wherein the circuitry is further configured to generate weighted collections of image points, wherein the image to target mapping is performed based on the weighted collections of image points.

(5) The apparatus of any one of (1) to (4), wherein the circuitry is further configured to derive an error metric of the derived ray support points, wherein the camera model is generated further based on the error metric.

(6) The apparatus of (5), wherein the circuitry is further configured to
calculate ray-target intersections;
compare the ray-target intersections with the ray support points to derive the error metric of the derived ray support points; and
transform the error metric from target coordinates into image coordinates.

(7) The apparatus of any one of (1) to (6), wherein the circuitry is further configured to model a target deformation based on a low resolution mesh whose deformation is applied to the ray support points of the sparse image based on bilinear interpolation.

(8) The apparatus of any one of (1) to (7), wherein the circuitry is further configured to
obtain a further calibration image representing a different view on the target than the calibration image; and
generate the camera model further based on the further calibration image.

(9) The apparatus of any one of (1) to (8), wherein the calibration image is captured by a camera of a multiple camera device, wherein the circuitry is further configured to
obtain a calibration image captured by another camera of the multiple camera device; and
generate the camera model further based on the calibration image captured by the other camera, wherein the camera model is a camera model for the multiple camera device.

(10) The apparatus of any one of (1) to (9), farther comprising the image sensor, wherein the image sensor comprises a plurality of pixels, wherein the camera model indicates ray support points derived from different calibration images, wherein the indicated ray support points derived from the different calibration images are to be projected onto a corresponding pixel of the image sensor.

(11) A method, comprising:
obtaining a calibration image of a target;
deriving a sparse image based on the calibration image, wherein the sparse image includes image points;
deriving ray support points based on the image points by performing an image to target mapping of the image points based on a polynomial function, wherein the ray support points being indicative of light rays reflected by the target and incidenting on an image sensor; and
generating a camera model based on the derived ray support points.

(12) The method of (11), wherein the target is a passive target.

(13) The method of (11) or (12), wherein the image to target mapping is performed based on a generic 2D polynomial function.

(14) The method of any one of (11) to (13), further comprising generating weighted collections of image points, wherein the image to target mapping is performed based on the weighted collections of image points.

(15) The method of any one of (11) to (14), further comprising deriving an error metric of the derived ray support points, wherein the camera model is generated further based on the error metric.

(16) The method of (15), further comprising:
calculating ray-target intersections;
comparing the ray-target intersections with the ray support points to derive the error metric of the derived ray support points; and
transforming the error metric from target coordinates into image coordinates.

(17) The method of any one of (11) to (16), further comprising modeling a target deformation based on a low resolution mesh whose deformation is applied to the ray support points of each sparse image based on bilinear interpolation.

(18) The method of any one of (11) to (17), further comprising:
obtaining a further calibration image representing a different view on the target than the calibration image; and
generating the camera model further based on the further calibration image.

(19) The method of any one of (11) to (18), wherein the calibration image is captured by a camera of a multiple camera device, wherein the method further comprises:
obtaining a calibration image captured by another camera of the multiple camera device; and
generating the camera model further based on the calibration image captured by the other camera, wherein the camera model is a camera model for the multiple camera device.

(20) The method of any one of (11) to (19), wherein the camera model indicates ray support points derived from different calibration images, wherein the indicated ray support points derived from the different calibration images are to be projected onto a corresponding pixel of the image sensor.

(21) A computer program comprising program code causing a computer to perform the method according to anyone of (11) to (20), when being carried out on a computer.

(22) A non-transitory computer-readable recording medium that stores therein a computer program product, which, when executed by a circuitry, causes the method according to anyone of (11) to (20) to be performed.

The invention claimed is:

1. An apparatus comprising:
circuitry configured to
obtain a calibration image of a target;
derive a sparse image based on the calibration image, wherein the sparse image includes image points;
derive ray support points based on the image points by performing an image to target mapping of the image points based on a polynomial function, wherein the ray support points are indicative of light rays reflected by the target and incidenting on an image sensor; and
generate a camera model based on the derived ray support points;
derive an error metric of the derived ray support points, wherein the camera model is generated further based on the error metric;
calculate ray-target intersections;
compare the ray-target intersections with the ray support points to derive the error metric of the derived ray support points; and
transform the error metric from target coordinates into image coordinates.

2. The apparatus of claim 1, wherein the target is a passive target.

3. The apparatus of claim 1, wherein the image to target mapping is performed based on a generic 2D polynomial function.

4. The apparatus of claim 1, wherein the circuitry, is further configured to
generate weighted collections of image points, wherein the image to target mapping is performed based on the weighted collections of image points.

5. The apparatus of claim 1, wherein the circuitry is further configured to
model a target deformation based on a low resolution mesh whose deformation is applied to the ray support points of the sparse image based on bilinear interpolation.

6. The apparatus of claim 1, wherein the circuitry is further configured to
obtain a further calibration image representing a different view on the target than the calibration image; and
generate the camera model further based on the further calibration image.

7. The apparatus of claim 1, wherein the calibration image is captured by a camera of a multiple camera device, wherein the circuitry is further configured to
obtain a calibration image captured by another camera of the multiple camera device; and
generate the camera model further based on the calibration image captured by the other camera, wherein the camera model is a camera model for the multiple camera device.

8. The apparatus of claim 1, further comprising the image sensor, wherein the image sensor comprises a plurality of pixels, wherein the camera model indicates ray support points derived from different calibration images, wherein the indicated ray support points derived from the different calibration images are to be projected onto a corresponding pixel of the image sensor.

9. A method, comprising:
obtaining a calibration image of a target;
deriving a sparse image based on the calibration image, wherein the sparse image includes image points;
deriving ray support points based on the image points by performing an image to target mapping of the image points based on a polynomial function, wherein the ray support points being indicative of light rays reflected by the target and incidenting on an image sensor;
generating a camera model based on the derived ray support points;
deriving, an error metric of the derived ray support points, wherein the camera model is generated further based on the error metric;
calculating ray-target intersections;
comparing the ray-target intersections with the ray support points to derive the error metric of the derived ray support points; and
transforming the error metric from target coordinates into image coordinates.

10. The method of claim 9, wherein the target is a passive target.

11. The method of claim 9, wherein the image to target mapping is performed based on a generic 2D polynomial function.

12. The method of claim 9, further comprising
generating weighted collections of image points, wherein the image to target mapping is performed based on the weighted collections of image points.

13. The method of claim 9, further comprising
modeling a target deformation based on a low resolution mesh whose deformation is applied to the ray support points of each sparse image based on bilinear interpolation.

14. The method of claim 9, further comprising:
obtaining a further calibration image representing a different view on the target than the calibration image; and
generating the camera model further based on the further calibration image.

15. The method of claim 9, wherein the calibration image is captured by a camera of a multiple camera device, wherein the method further comprises:
obtaining a calibration image captured by another camera of the multiple camera device; and generating the camera model further based on the calibration image captured by the other camera, wherein the camera model is a camera model for the multiple camera device.

16. The method of claim 9, wherein the camera model indicates ray support points derived from different calibration images, wherein the indicated ray support points derived from the different calibration images are to be projected of to a corresponding pixel of the image sensor.

* * * * *